United States Patent
Katikaneni et al.

(10) Patent No.: US 12,244,044 B2
(45) Date of Patent: Mar. 4, 2025

(54) DIRECT AMMONIA-FED SOLID OXIDE FUEL CELL AND METHODS FOR MAKING THE SAME

(71) Applicants: Saudi Arabian Oil Company, Dhahran (SA); Korea Advanced Institute of Science and Technology, Daejeon (KR)

(72) Inventors: Sai P. Katikaneni, Dhahran (SA); Kunho Lee, Dhahran (SA); Kangyong Lee, Daejeon (KR); Joongmyeon Bae, Daejeon (KR); WooChul Jung, Daejeon (KR)

(73) Assignees: Saudi Arabian Oil Company, Dhahran (SA); Korea Advanced Insitute of Science and Technology, Daejeon (KR)

(*) Notice: Subject to any disclaimer, the term of this patent is extended or adjusted under 35 U.S.C. 154(b) by 89 days.

(21) Appl. No.: 17/367,871

(22) Filed: Jul. 6, 2021

(65) Prior Publication Data
US 2022/0006110 A1 Jan. 6, 2022

Related U.S. Application Data

(60) Provisional application No. 63/048,260, filed on Jul. 6, 2020.

(51) Int. Cl.
*H01M 8/22* (2006.01)
*H01M 4/86* (2006.01)
(Continued)

(52) U.S. Cl.
CPC ......... *H01M 8/222* (2013.01); *H01M 4/8605* (2013.01); *H01M 4/8652* (2013.01);
(Continued)

(58) Field of Classification Search
CPC ............ H01M 8/0656; H01M 8/0606; H01M 8/0662; H01M 8/222; H01M 4/8605;
(Continued)

(56) References Cited

U.S. PATENT DOCUMENTS

| | | |
|---|---|---|
| 4,014,780 A | 3/1977 | Mccoy |
| 8,034,499 B2 | 10/2011 | Grieve et al. |

(Continued)

FOREIGN PATENT DOCUMENTS

| | | |
|---|---|---|
| CN | 106868529 A | 6/2017 |
| EP | 0972855 A1 | 1/2000 |

(Continued)

OTHER PUBLICATIONS

International Search Report and Written Opinion dated Oct. 15, 2021 pertaining to International application No. PCT/US2021/040483 filed Jul. 6, 2021, 15 pages.

(Continued)

*Primary Examiner* — Eugenia Wang
(74) *Attorney, Agent, or Firm* — DINSMORE & SHOHL LLP (57) ABSTRACT

According to embodiments of the present disclosure, a solid oxide fuel cell includes a cathode, an anode, and a solid oxide electrolyte between the anode and the cathode. The solid oxide electrolyte includes a solid oxide, and the anode includes a porous scaffold. The porous scaffold includes a solid oxide having metal-based catalysts disposed on one or more surfaces of the porous scaffold. In embodiments, at least one ammonia decomposition layer is disposed proximate the surface of the porous scaffold and is configured to convert ammonia into hydrogen and nitrogen for subsequent feed of hydrogen to the anode. The ammonia decomposition layer also includes a metal decomposition catalyst.

13 Claims, 5 Drawing Sheets

(51) Int. Cl.
   *H01M 4/90* (2006.01)
   *H01M 8/0606* (2016.01)
   *H01M 8/12* (2016.01)
(52) U.S. Cl.
   CPC ....... *H01M 4/9058* (2013.01); *H01M 4/9066* (2013.01); *H01M 8/0606* (2013.01); *H01M 2008/1293* (2013.01)
(58) Field of Classification Search
   CPC ............. H01M 4/8652; H01M 4/9041; H01M 4/9058; H01M 4/9066; H01M 2008/1293
   See application file for complete search history.

(56) References Cited

U.S. PATENT DOCUMENTS

| | | | |
|---|---|---|---|
| 9,583,778 | B2 | 2/2017 | Schaevitz et al. |
| 2009/0159498 | A1 | 6/2009 | Chinn et al. |
| 2009/0286125 | A1* | 11/2009 | Setlock ............... H01M 8/1226 264/618 |
| 2015/0147677 | A1 | 5/2015 | Barnett et al. |
| 2015/0321975 | A1 | 11/2015 | Choi et al. |
| 2017/0062799 | A1* | 3/2017 | Song .................. H01M 4/8878 |
| 2017/0317371 | A1 | 11/2017 | Higashino et al. |
| 2018/0187096 | A1 | 7/2018 | Choi et al. |
| 2018/0187097 | A1 | 7/2018 | Choi et al. |
| 2018/0258353 | A1 | 9/2018 | Choi et al. |
| 2018/0342739 | A1 | 11/2018 | Hughes |
| 2019/0040535 | A1 | 2/2019 | MacFarlane et al. |
| 2019/0051920 | A1 | 2/2019 | Pan et al. |
| 2021/0122985 | A1 | 4/2021 | Choi et al. |

FOREIGN PATENT DOCUMENTS

| | | | | |
|---|---|---|---|---|
| GB | 2393320 | A | * 3/2004 | ............. H01M 4/90 |
| JP | 2005272856 | A | 10/2005 | |
| JP | 2007115492 | A | 5/2007 | |
| JP | 2008501216 | A | 1/2008 | |
| JP | 2013209685 | A | 10/2013 | |
| JP | 5812513 | B2 | 11/2015 | |
| JP | 5939501 | B2 | 6/2016 | |
| JP | 2017050180 | A | 3/2017 | |
| JP | 2019026936 | A | 2/2019 | |
| JP | 2019502019 | A | 4/2019 | |
| JP | 2019509615 | A | 4/2019 | |
| JP | 2013085999 | A | 5/2023 | |
| WO | 2010051441 | A1 | 5/2010 | |
| WO | 2017115709 | A | 7/2017 | |
| WO | 2019066531 | A1 | 4/2019 | |

OTHER PUBLICATIONS

Yoon, B. Y. et al. "Effects of infiltrated Sr and Mn doped MlCrO3 on porous La0.8Sr0.2Ga0.8Mg0.2 O3-δ scaffolds used as anodes in solid oxide fuel cells" Solid State Ionics, vol. 249, Aug. 3, 2013, pp. 26-33.
International Search Report and Written Opinion dated Oct. 14, 2021 pertaining to International application No. PCT/US2021/040481 filed Jul. 6, 2021, 13 pages.
International Search Report and Written Opinion dated Nov. 4, 2021 pertaining to International application No. PCT/US2021/040466 filed Jul. 6, 2021, 12 pages.
Afif et al., "Ammonia-fed fuel cells: a comprehensive review", Renewable and Sustainable Energy Reviews, vol. 60, pp. 822-835, 2016.
Amar et al., "Electrochemical synthesis of ammonia based on a carbonate-oxide composite electrolyte", Solid State Ionics, vol. 182, pp. 133-138, 2011.
Amar et al., "Solid-State electrochemical synthesis of ammonia: a review", J. Solid State Electrochem, vol. 15, pp. 1845-1860, 2011.
Amar, et al., "Electrochemical synthesis of ammonia from wet nitrogen using La0.6Sr0.4FeO3-δ-Ce0.8Gd0.18Ca0.02O2-δ composite cathode", Royal Society of Chemistry, vol. 4, pp. 18749-18754, 2014.

Cacho-Bailo et al., "ZIF-8 continuous membrane on porous polysulfone for hydrogen separation", Journal of Membrane Science, vol. 464, pp. 119-126, 2014.
Cinti et al., "SOFC operating with ammonia: Stack test and system analysis", International Journal of Hydrogen Energy, vol. 41, pp. 13583-13590, 2016.
Fournier et al., "High performance direct ammonia solid oxide fuel cell", Journal of Power Sources, vol. 162, pp. 198-206, 2006.
Gade et al., The effects of fabrication and annealing on the structure and hydrogen permeation of Pd-Au binary alloy membranes, Journal of Membrane Science, vol. 340, pp. 227-233, 2009.
Ganley, Ammonia Fuel Cell Systems:, Ammonia: The Key to a Hydrogen Economy, https://www.slideshare.net/JaccovanEerde/ammonia-full-cell, accessed 2021.
Garagounis et al., "Electrochemical synthesis of ammonia in solid electrolyte cells", Frontiers in Energy Research, vol. 2, Article 1, pp. 1-10, Jan. 2014.
Garcia-Garcia et al., "High purity hydrogen production by low temperature catalytic ammonia decomposition in a multifunctional membrane reactor", Catalysis Communications, vol. 9, pp. 482-486, 2008.
Giddey et al., "Review of electrochemical ammonia production technologies and materials", International Journal of Hydrogen Energy, vol. 38, pp. 14576-14594, 2013.
Gawk et al., "Alkaline Ammonia Electrolysis on Electrodeposited Platinum for Controllable Hydrogen Production", Chem Sus Chem, vol. 9, pp. 403-408, 2016.
Jiang et al., "Eloectrolysis of ammonia for hydrogen production catalyzed by Pt and Pt—Ir deposited on nickel foam", Journal of Energy Chemistry, vol. 23, pp. 1-8, 2014.
Kordali et al., "Electrochemical synthesis of ammonia at atmospheric pressure and low temperature in a solid polymer electrolyte cell", The Royal Society of Chemistry, Chem. Commun, pp. 1673-1674, 2000.
Lan et al., "Synthesis of ammonia directly from air and water at ambient temperature and pressure", Scientific Reports, vol. 3, No. 1144, pp. 1-7, Jan. 29, 2013.
Licht et al., "Ammonia synthesis by N2 and steam electrolysis in molten hydroxide suspensions of nanoscale Fe2O3", Science, vol. 345, Issue 6197, pp. 637-640, Aug. 8, 2014.
Liu et al., "Synthesis of ammonia at atmospheric pressure with Ce0.8M0.2O2-δ (M=La, Y, Gd, Sm) and their proton conduction at intermediate temperature" Solid State Ionics, vol. 177, pp. 73-76, 2006.
Liu et al., "Improved performance of ammonia-fueled solid oxide fuel cell with SSZ thin film electrolyte and Ni-SSZ anode functional layer", International Journal of Hydrogen Energy, vol. 37, pp. 10857-10865, 2012.
Ma et al., "A high-performance ammonia-fueled solid oxide fuel cell", Journal of Power Sources, vol. 161, pp. 95-98, 2006.
Ma et al., "A high-performance ammonia-fueled SOFC based on a YSZ thin-film electrolyte", Journal of Power Sources, vol. 164, pp. 86-89, 2007.
Morgan et al., "Wind-powered ammonia fuel production for remote island: A case study", Renewable Energy, vol. 72, pp. 51-61, 2014.
Murakami et al., "Electrolytic Synthesis of Ammonia in Molten Salts under Atmospheric Pressure", J. Am. Chem. Soc., vol. 125, pp. 334-335, 2003.
Murakami et al., "Electrolytic ammonia synthesis from water and nitrogen gas in molten salt under atmospheric pressure", Electrochimica Acta, vol. 50, pp. 5423-5426, 2005.
Murakami et al., "Electrolytic Synthesis of Ammonia from Water and Nitrogen under Atmosheric Pressure Using a Boron-Doped Diamond Electrode as a Nonconsumable Anode", Electrochemical and Solid-State Letters, vol. 10, No. 4, pp. E4-E6, 2007.
Ni, "Thermo-electrochemical modeling of ammonia-fueled solid oxide fuel cells considering ammonia thermal decomposition in the anode", International Journal of Hydrogen Energy, vol. 36, pp. 3153-3166, 2011.
Skodra et al., "Electrocatalytic synthesis of ammonia from steam and nitrogen at atmospheric pressure", Solid States Ionics, vol. 180, pp. 1332-1336, 2009.

(56) References Cited

OTHER PUBLICATIONS

Vitse et al., "On the use of ammonia electrolysis for hydrogen production", Journal of Power Sources, vol. 142, pp. 18-26, 2005.
Wojcik et al., "Ammonia as a fuel in solid oxide fuel cells", Journal of Power Sources, vol. 118, pp. 342-348, 2003.
Xie et al., "An ammonia fuelled SOFC with a BaCe0.9Nd0.1O3-δ thin electrolyte prepared with a suspension spray", Journal of Power Sources, vol. 170, pp. 38-41, 2007.
U.S. Office Action dated Sep. 9, 2021 pertaining to U.S. Appl. No. 16/902,847, filed Jun. 16, 2020, 12 pages.
U.S. Office Action dated Sep. 16, 2021 pertaining to U.S. Appl. No. 17/142,746, filed Jan. 6, 2021, 12 pages.
Office Action issued Jan. 4, 2024 in related Japanese Application No. 2023-500367 filed Jul. 6, 2021.
Office Action issued Mar. 1, 2024 in related Japanese Application No. 2023-501251 filed Jul. 6, 2021.
Office Action issued Mar. 21, 2024 in related Japanese Application No. 2023500366 filed Jul. 6, 2021.

\* cited by examiner

DIRECT AMMONIA-FED SOLID OXIDE FUEL CELL AND METHODS FOR MAKING THE SAME

CROSS-REFERENCE TO RELATED APPLICATION

This application claims priority to U.S. Provisional Application Ser. No. 63/048,260 filed Jul. 6, 2020, the entire content of which is hereby incorporated by reference.

TECHNICAL FIELD

Embodiments described herein relate generally to solid oxide fuel cells, and more particularly to direct ammonia-fed solid oxide fuel cells to generate power without carbon dioxide ($CO_2$).

BACKGROUND

Hydrogen has been studied as a source of energy because it is free of carbon dioxide ($CO_2$), a major component in greenhouse gas (GHG) emissions. However, hydrogen has a low gravimetric energy density and is difficult to handle because of its low liquefaction temperature. Various hydrogen carriers have been studied, and among one of the most promising is ammonia. In particular, ammonia has a low liquefaction pressure at room temperature, and it can be stored and transported efficiently. Additionally, ammonia is $CO_2$-free and has a 17 wt % higher gravimetric hydrogen capacity as compared to other liquid organic hydrogen carriers.

However, additional reaction steps to enable the anode of a solid oxide fuel cell (SOFC) result in a reaction rate that is slow, and provides low power density. Additionally, Ni-YSZ, a material widely used for forming anodes, has to resist redox reactions to crack ammonia, which can result in the formation of NiO and $Ni_3N$ at the anode. This redox reaction can cause cell degradation or even electrolyte cracking by increasing interfacial polarization between the anode and electrolyte.

SUMMARY

Based on the foregoing, approaches to use ammonia as a hydrogen carrier in solid oxide fuel cells may be desired. Various embodiments described herein meet those needs and are directed to direct ammonia-fed solid oxide fuel cells with advanced anode cell design and materials for $CO_2$-free power generation. In embodiments, the anode includes a porous scaffold that includes a solid oxide having metal-based catalysts disposed on one or more surfaces of the porous scaffold and an ammonia decomposition layer proximate the surface of the porous scaffold. The ammonia decomposition layer is configured to convert ammonia into hydrogen and nitrogen for subsequent feed of hydrogen to the anode.

According to an embodiment of the present disclosure, a solid oxide fuel cell includes a cathode, an anode, and a solid oxide electrolyte between the anode and the cathode. The solid oxide electrolyte includes a solid oxide, and the anode includes a porous scaffold. The porous scaffold includes a solid oxide having metal-based catalysts disposed on one or more surfaces of the porous scaffold. In embodiments, at least one ammonia decomposition layer is disposed proximate the surface of the porous scaffold and is configured to convert ammonia into hydrogen and nitrogen for subsequent feed of hydrogen to the anode. The ammonia decomposition layer also includes a metal decomposition catalyst.

According to at least one embodiment of the present disclosure, a method includes passing ammonia to an ammonia decomposition layer of a solid oxide fuel cell including a cathode, an anode, and a solid oxide electrolyte between the anode and the cathode. The anode includes a porous scaffold including a solid oxide having metal-based catalysts disposed on one or more surfaces of the porous scaffold. The ammonia decomposition layer is disposed upstream of the anode and comprises a metal decomposition catalyst. Passing the ammonia to the ammonia decomposition layer converts the ammonia to nitrogen and hydrogen. The method further includes passing the hydrogen to the anode.

These and other embodiments are described in more detail in the following Detailed Description, as well as the appended drawings. The accompanying drawings are included to provide a further understanding of the various embodiments, and are incorporated into and constitute a part of this specification. The drawings illustrate the various embodiments described herein, and together with the description, serve to explain the principles and operations of the claimed subject matter.

BRIEF DESCRIPTION OF THE DRAWINGS

Referring now to the illustrative examples in the drawings.

DETAILED DESCRIPTION

Specific embodiments of the present application will now be described. The disclosure may, however, be embodied in different forms and should not be construed as limited to the embodiments set forth in this disclosure. Rather, these embodiments are provided so that this disclosure will be thorough and complete, and will fully convey the scope of the subject matter to those skilled in the art.

Figure 1:
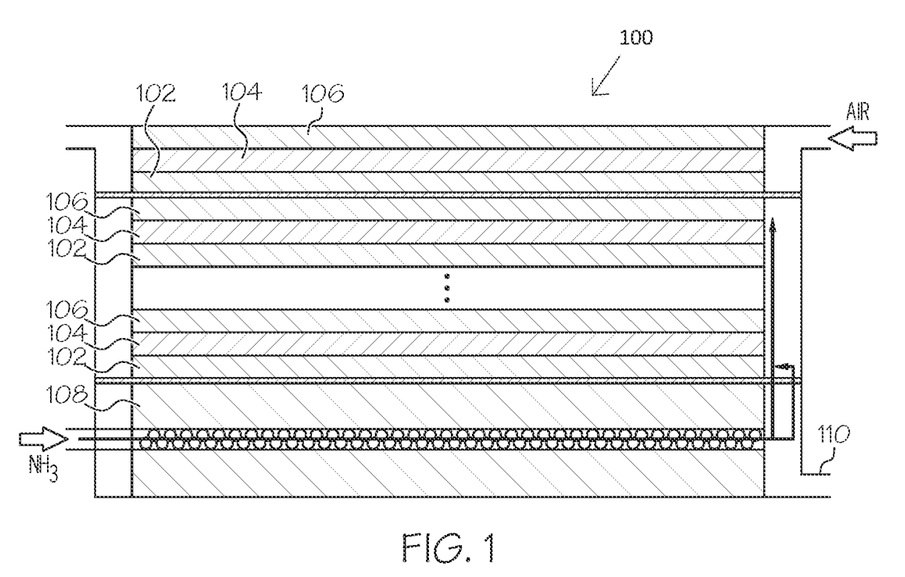
FIG. 1 is an illustration of an example solid oxide fuel cell stack according to one or more embodiments shown and described herein.
Figure 2A:
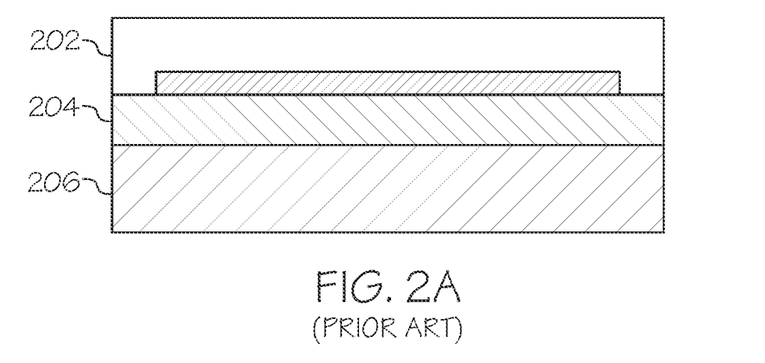
FIG. 2A is an illustration of a conventional solid oxide fuel cell.
Figure 2B:
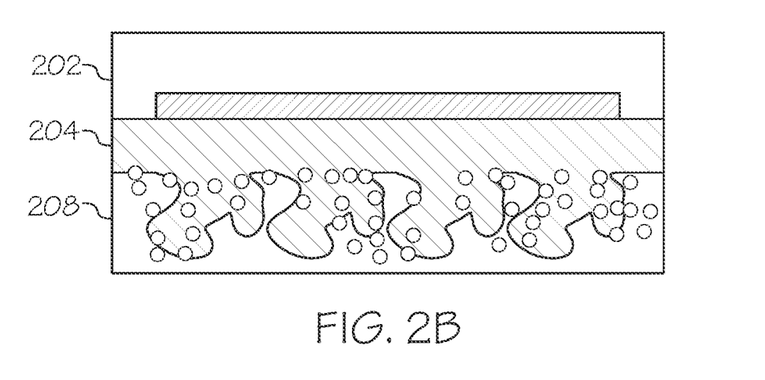
FIG. 2B is an illustration of an example solid oxide fuel cell in which the anode has a scaffold structure according to one or more embodiments shown and described herein.
Figure 2C:
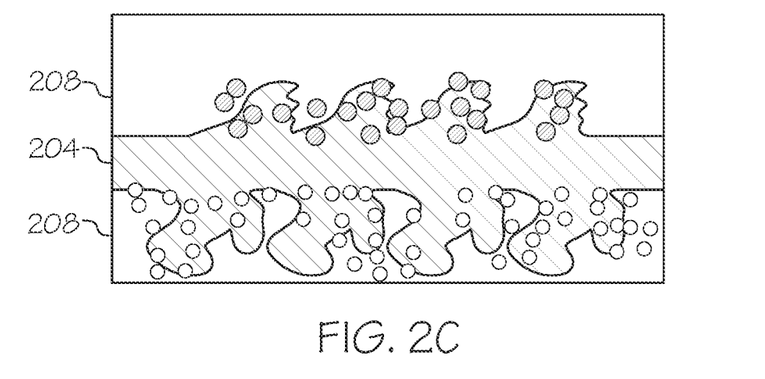
FIG. 2C is an illustration of an example solid oxide fuel cell in which the cathode and anode have a scaffold structure according to one or more embodiments shown and described herein.

FIG. 1 illustrates an example SOFC stack 100. The SOFC stack 100 includes a plurality of SOFCs connected in series to combine the electricity that each SOFC generates. Each SOFC in the SOFC stack 100 includes an anode 102, an electrolyte 104, and a cathode 106. The SOFC stack 100 further includes at least one ammonia decomposition layer 108. FIGS. 2A-2C illustrate additional examples of SOFCs. Specifically, FIG. 2A illustrates a conventional SOFC that includes a conventional $La_{0.6}Sr_{0.4}Co_{0.2}Fe_{0.8}O_3$ (LSCF) cathode 202, a $La_{0.8}Sr_{0.2}Ga_{0.83}Mg_{0.17}O_{2.815}$ (LSGM) electrolyte 204, and a $La_{0.8}Sr_{0.2}Ga_{0.83}Mg_{0.17}O_{2.815}$ (LSGM)/$La_{0.75}Sr_{0.25}Cr_{0.50}Mn_{0.50}O_3$ (LCSM) anode 206. FIG. 2B illustrates a SOFC according to various embodiments in which the conventional anode is replaced with a LGSM scaffold 208 anode while the cathode is a conventional cathode 202. FIG. 2C illustrates a SOFC according to various embodiments in which the conventional anode and the conventional cathode are each replaced with a LGSM scaffold 208.

In various embodiments, the anode 102 is in the form of a porous scaffold. As used herein, the term "porous" means a structure including one or more pores to permit flow of gas and impregnation of metal catalysts. The porous scaffold of various embodiments is a solid oxide. In embodiments, the solid oxide can be, for example, $La_{0.6}Sr_{0.4}Co_{0.2}Fe_{0.8}O_3$ (LSCF), $La_{0.2}Sr_{0.8}TiO_3$ (LST) nanofibers, $La_{0.8}Sr_{0.2}Ga_{0.83}Mg_{0.17}O_{2.815}$ (LSGM), $La_{0.75}Sr_{0.25}Cr_{0.50}Mn_{0.50}O_3$ (LCSM), $PrBaMn_2O_{5+\delta}$ (PMBO), $Ce_{0.9}Gd_{0.1}O_{1.95}$ (GDC), $Sm_{0.2}Ce_{0.8}O_{1.9}$ (SDC), Yttria-stabilized Zirconia (YSZ), Scandia-stabilized Zirconia (ScSZ), or combinations thereof. In various embodiments, the porous scaffold includes one or more nano-scale advanced metal catalysts within the scaffold structure.

For example, the anode 102 also includes metal-based catalysts disposed on one or more surfaces of the porous scaffold. In embodiments, the metal-based catalysts are at least partially embedded below or within the surface of the porous scaffold. For example, nano-scale catalysts (e.g., LCSF, LST, LSCM, PMBO, and the like) can be embedded within the scaffold structure by impregnating the scaffold structure with the catalyst after fabrication of the scaffold structure. Accordingly, agglomeration of the nano-scale catalysts can be avoided and high performance can be obtained despite the use of a perovskite material due to the high surface area of the catalyst. In this context, "embedded" and "infiltrated" may be synonymous. The metal-based catalysts may be referred to as "infiltrated into" or "embedded in" the anode (or the porous scaffold), and the anode may be referred to as a "metal infiltrated" or "metal embedded" anode.

In various embodiments, the metal-based catalyst can be a metal or metal oxide. Metals suitable for use as the catalyst include, for example, nickel, platinum, or combinations thereof. Metal oxides suitable for use as the catalyst include, for example, $La_{0.75}Sr_{0.25}$, $Cr_{0.50}Mn_{0.50}O_3$ (LCSM), $PrBaMn_2O_{5+\delta}$ (PBMO), or combinations thereof. In embodiments, the metal-based catalyst is in the form of nanosized particles, for example, particles being from 10 nm to 100 nm. Without being bound by theory, it is believed that infiltration of the scaffold with nanosized catalyst particles can achieve high electrochemical performance and durability by increasing the triple phase boundary (TPB) length. In particular, the dispersion of the catalyst along many surfaces of a scaffold provides many reaction sites for the electrochemical reaction of the SOFC.

The electrolyte 104 is a solid oxide electrolyte that comprises a dense solid oxide that is sandwiched between the anode 102 and the cathode 106. As used herein, a "dense" electrolyte is an electrolyte through which oxygen and hydrogen cannot pass and which completely separates the two gases. The solid oxide electrolyte may include, for example, $La_{0.8}Sr_{0.2}Ga_{0.83}Mg_{0.17}O_{2.815}$ (LSGM), $Ce_{0.9}Gd_{0.1}O_{1.95}$ (GDC), $Sm_{0.2}Ce_{0.8}O_{1.9}$ (SDC), Yttria-stabilized Zirconia (YSZ), Scandia-stabilized Zirconia (ScSZ), or combinations thereof. In embodiments, the solid oxide of the solid oxide electrolyte is the same solid oxide as is included in the porous scaffold of the anode.

In various embodiments, the cathode 106 is an air electrode that allows diffusion of gaseous oxygen towards the cathode/electrolyte interface. The cathode 106 can include, for example, perovskite materials, for example, lanthanum strontium manganite (LSM)-based perovskites. Other example cathode compositions include Sr-doped lanthanum ferrite (LSF) materials and Sr-doped lanthanum ferro-cobaltite (LSCF) materials. In embodiments, the cathode includes $La_{0.6}Sr_{0.4}Co_{0.2}Fe_{0.8}O_3$ (LSCF) infiltrated with $La_{1-x}Sr_xMnO_3$ (LSM). In embodiments, such as the embodiment shown in FIG. 2C, the cathode 106 includes a porous scaffold comprising a solid oxide having metal-based catalysts disposed on one or more surfaces of the porous scaffold. In such embodiments, the solid oxide and the metal-based catalysts may be as described above with respect to the structure of the anode 102. As will be described in greater detail below, the use of the scaffold structure for both the anode 102 and the cathode 106 can result in an increase in power density and improved performance over conventional SOFCs. However, in embodiments, such as the embodiment shown in FIG. 2B, the cathode 106 can be a conventional air electrode while the anode 102 has a scaffold structure, and increases in power density and improved performance over conventional SOFCs can still be observed.

In embodiments, the ammonia decomposition layer 108 is disposed proximate the surface of the porous scaffold of the anode 102, and is configured to convert ammonia ($NH_3$) into hydrogen gas ($H_2$) and nitrogen gas ($N_2$) in accordance with the following reaction:

$$2NH_3 \rightarrow 2H_2 + N_2$$

In embodiments in which the SOFC has a stack configuration, interconnect components enable physical separation of hydrogen and oxygen and transfer produced electricity. Accordingly, the ammonia decomposition layer may be present as an independent ammonia decomposition layer instead of being deposited on the surface of the anode 102. The hydrogen gas ($H_2$) generated by the ammonia decomposition layer 108 is provided as a feed of hydrogen gas to the anode 102.

In various embodiments, the ammonia decomposition layer 108 includes a metal decomposition catalyst. The metal decomposition catalyst can be, for example, nickel, iron, cobalt, or combinations thereof. In embodiments, the metal decomposition catalyst is supported on a metal substrate, for example, an aluminum substrate, a magnesium oxide (MgO) substrate, a silicon dioxide ($SiO_2$) substrate, or a zirconium dioxide ($ZrO_2$) substrate. The particular substrate selected may vary depending on the particular embodiment, since the substrate can change the active metal dispersion and its activity. Furthermore, the surface area of the substrate may impact the active metal catalyst dispersion and the corresponding intrinsic activity of the catalyst. However, in embodiments, the metal decomposition catalyst can form the ammonia decomposition layer 108 without a separate support.

In operation, an air feed flows air including oxygen into the system through an air inlet. As the air contacts the cathode, oxygen atoms are reduced within the cathode layer to create oxygen ions ($O^{2-}$) which flow toward the solid oxide electrolyte. Reduction of the oxygen in the air by the cathode proceeds according to the following reaction:

$$O_2 + 4e^- \rightarrow 2O^{2-}$$

Oxygen-deficient air is exhausted from the system. The oxygen ions ($O^{2-}$) travel through the solid oxide electrolyte and into the anode, where they react with hydrogen gas ($H_2$) to generate $H_2O$ and electrons ($e^-$) according to the following reaction:

$$H_2 + O^{2-} \rightarrow H_2O + 2e^-$$

The electrons ($e^-$) flow from the anode into an electronic circuit and back into the cathode, where they are used to reduce the $O_2$ in the air feed. The electronic circuit uses the flow of electrons to power a device.

In various embodiments, the scaffold is made by a screen printing method in which a paste is printed on the top of substrate. The paste is made by mixing scaffold material with an ink vehicle. The ink vehicle, in various embodiments, is composed of alphaterpineol, ethyl cellulose, polyvinyl butyral, dibutyl phthalate, poly ethylene glycol. Following printing, the paste is dried and sintered at high temperature between 1000° C. and 1250° C., forming the scaffold. Then, catalyst precursor solutions (nitrate or citrate, etc.) are infiltrated into the scaffold, and calcined at 500° C. Infiltration is repeated until the amount of catalyst reaches 25-30 wt % of the weight of scaffold.

According to an aspect, either alone or in combination with any other aspect, a solid oxide fuel cell comprises a cathode, an anode, and a solid oxide electrolyte between the anode and the cathode. The solid oxide electrolyte comprises a solid oxide. The anode comprises a porous scaffold, the porous scaffold comprising a solid oxide having metal based catalysts disposed on one more surfaces of the porous scaffold. At least one ammonia decomposition layer is disposed proximate the surface of the porous scaffold and configured to convert ammonia into hydrogen and nitrogen for subsequent feed of hydrogen to the anode, the ammonia decomposition layer comprising a metal decomposition catalyst.

According to a second aspect, either alone or in combination with any other aspect, the metal based catalysts are at least partially embedded below the surface of the porous scaffold.

According to a third aspect, either alone or in combination with any other aspect, the porous scaffold comprises $La_{0.75}Sr_{0.25}Cr_{0.50}Mn_{0.50}O_3$ (LCSM), $La_{0.6}Sr_{0.4}Co_{0.2}Fe_{0.8}O_3$ (LSCF), $La_{0.2}Sr_{0.8}TiO_3$ (LST) nanofibers, or combinations thereof.

According to a fourth aspect, either alone or in combination with any other aspect, the solid oxide electrolyte and the porous scaffold of the anode comprise the same solid oxide.

According to a fifth aspect, either alone or in combination with any other aspect, the solid oxide electrolyte, the anode or both comprise $La_{0.8}Sr_{0.2}Ga_{0.83}Mg_{0.17}O_{2.815}$ (LSGM), $La_{0.75}Sr_{0.25}Cr_{0.50}Mn_{0.50}O_3$ (LCSM), $PrBaMn_2O_{5+\delta}$ (PBMO), stabilized Zr, or combinations thereof.

According to a sixth aspect, either alone or in combination with any other aspect, both the solid oxide electrolyte and the anode comprise $La_{0.8}Sr_{0.2}Ga_{0.83}Mg_{0.17}O_{2.815}$ (LSGM), $La_{0.75}Sr_{0.25}Cr_{0.50}Mn_{0.50}O_3$ (LCSM), $PrBaMn_2O_{5+\delta}$ (PBMO), stabilized Zr, or combinations thereof.

According to a seventh aspect, either alone or in combination with any other aspect, the cathode comprises a porous scaffold, the porous scaffold comprising a solid oxide having metal based catalysts disposed on one more surfaces of the porous scaffold.

According to an eighth aspect, either alone or in combination with any other aspect, the metal based catalyst comprises metals selected from nickel, platinum, or combinations thereof.

According to a ninth aspect, either alone or in combination with any other aspect, the metal based catalyst comprises metal oxides selected from $La_{0.75}Sr_{0.25}Cr_{0.50}Mn_{0.50}O_3$ (LCSM), $PrBaMn_2O_{5+\delta}$ (PBMO), or combinations thereof.

According to a tenth aspect, either alone or in combination with any other aspect, the metal decomposition catalyst comprises nickel.

According to an eleventh aspect, either alone or in combination with any other aspect, the cathode comprises $La_{0.6}Sr_{0.4}Co_{0.2}Fe_{0.8}O_3$ (LSCF) infiltrated with $La_{1-x}Sr_xMnO_3$ (LSM).

According to a twelfth aspect, either alone or in combination with any other aspect, the ammonia decomposition catalyst comprises a metal substrate which supports the decomposition catalyst.

According to a thirteenth aspect, either alone or in combination with any other aspect, a method comprises passing ammonia to at least one ammonia decomposition layer of a solid oxide fuel cell, which thereby converts the ammonia to nitrogen and hydrogen, and passing the hydrogen to the anode. The solid oxide fuel cell comprises a cathode, an anode, and a solid oxide electrolyte between the anode and the cathode. The solid oxide electrolyte comprises a solid oxide. The anode comprises a porous scaffold, the porous scaffold comprising a solid oxide having metal based catalysts disposed on one more surfaces of the porous scaffold. At least one ammonia decomposition layer is disposed upstream of the anode and comprises a metal decomposition catalyst.

According to a fourteenth aspect, either alone or in combination with any other aspect, the anode ionizes the hydrogen in the anode by removing electrons.

According to a fifteenth aspect, either alone or in combination with any other aspect, the method further comprises contacting the cathode of the solid oxide fuel cell with an air feed comprising oxygen to produce oxygen ions and an oxygen-deficient air.

According to a sixteenth aspect, either alone or in combination with any other aspect, the metal based catalysts are at least partially embedded below the surface of the porous scaffold.

According to a seventeenth aspect, either alone or in combination with any other aspect, the porous scaffold comprises $La_{0.75}Sr_{0.25}Cr_{0.50}Mn_{0.50}O_3$ (LCSM), $La_{0.6}Sr_{0.4}Co_{0.2}Fe_{0.8}O_3$ (LSCF), $La_{0.2}Sr_{0.8}TiO_3$ (LST) nanofibers, or combinations thereof.

According to an eighteenth aspect, either alone or in combination with any other aspect, the solid oxide electrolyte and the porous scaffold of the anode comprise the same solid oxide.

According to a nineteenth aspect, either alone or in combination with any other aspect, the anode or both comprise $La_{0.8}Sr_{0.2}Ga_{0.83}Mg_{0.17}O_{2.815}$ (LSGM), $La_{0.75}Sr_{0.25}Cr_{0.50}Mn_{0.50}O_3$ (LCSM), $PrBaMn_2O_{5+\delta}$ (PBMO), stabilized Zr, or combinations thereof.

According to a twentieth aspect, both the solid oxide electrolyte and the anode comprise $La_{0.8}Sr_{0.2}Ga_{0.83}Mg_{0.17}O_{2.815}$ (LSGM), $La_{0.75}Sr_{0.25}Cr_{0.50}Mn_{0.50}O_3$ (LCSM), $PrBaMn_2O_{5+\delta}$ (PBMO), stabilized Zr, or combinations thereof.

According to a twenty-first aspect, the cathode comprises a porous scaffold, the porous scaffold comprising a solid oxide having metal based catalysts disposed on one more surfaces of the porous scaffold.

According to a twenty-second aspect, the metal based catalyst comprises metals selected from nickel, platinum, or combinations thereof.

According to a twenty-third aspect, the metal based catalyst comprises metal oxides selected from $La_{0.75}Sr_{0.25}Cr_{0.50}Mn_{0.50}O_3$ (LCSM), $PrBaMn_2O_{5+\delta}$ (PBMO), or combinations thereof.

According to a twenty-fourth aspect, the metal decomposition catalyst comprises nickel.

According to a twenty-fifth aspect, the cathode comprises $La_{0.6}Sr_{0.4}Co_{0.2}Fe_{0.8}O_3$ (LSCF) infiltrated with $La_{1-x}Sr_xMnO_3$ (LSM).

According to a twenty-sixth aspect, the ammonia decomposition catalyst comprises a metal substrate which supports the decomposition catalyst.

EXAMPLES

The following examples illustrate features of the present disclosure but are not intended to limit the scope of the disclosure.

Example 1

In order to determine the effect of anode and/or cathode design on power density and cell voltage, power density and cell voltage were measured using a potentiostat for current densities from 0 up to about 0.7 $A/cm^2$ at 800° C. for the SOFCs depicted in FIGS. 2A-2C, each having an electrolyte that was approximately 1 millimeter (mm) thick using a hydrogen feed at the anode and an air feed at the cathode. The results are shown in FIG. 3.

Figure 3:
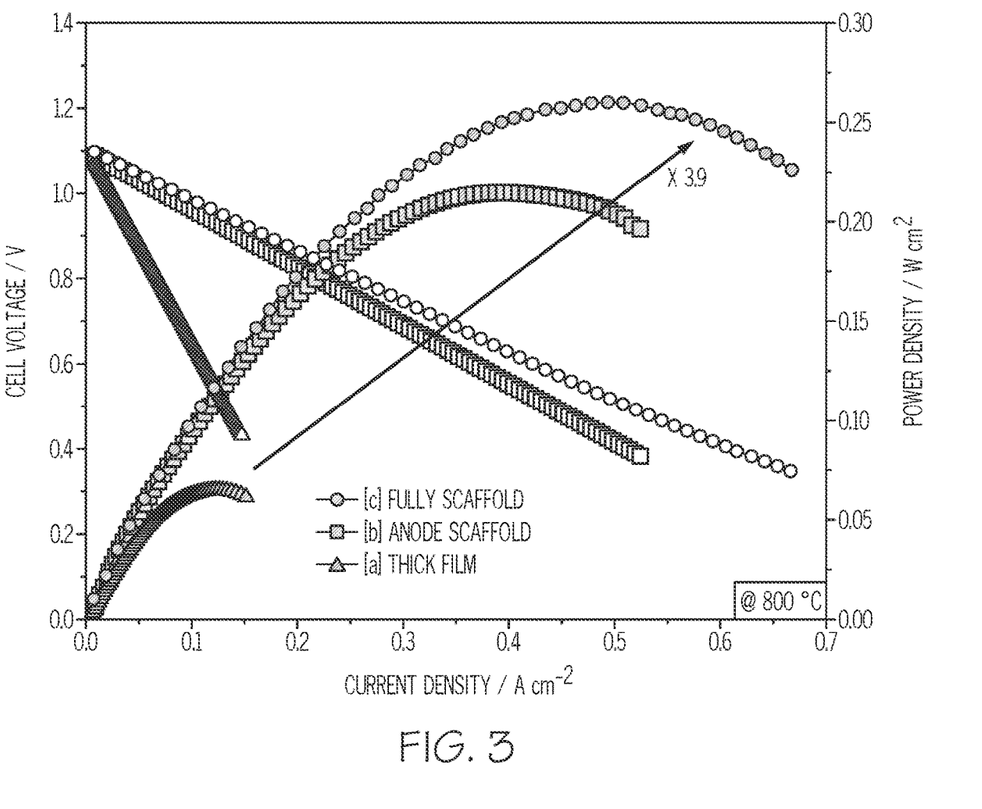
FIG. 3 is a plot of the cell voltage (left y-axis; in volts (V)) and the power density (right y-axis; in watts per square centimeter ($W/cm^2$)) as a function of current density (x-axis; in amps per square centimeter ($A/cm^2$)) for the SOFCs of FIGS. 2A-2C at 800° C.

As shown in FIG. 3, the power density increases nearly four-fold when both the anode and cathode are constructed from scaffolds instead of having a conventional structure. FIG. 3 also illustrates that even replacing just the anode with a scaffold structure results in a significant improvement in power density over the conventional SOFC, particular for current densities greater than 0.1 $A/cm^2$.

Example 2

Typical AS-SOFCs were tested to observe the effect of the thickness of the anode on the decomposition rate of ammonia. In this Example, an AS-SOFC having an anode with a thickness of about 300 μm was evaluated at a 700° C. and 750° C. for pure $H_2$, mixture for 75% $H_2$ and 25% $N_2$, and $NH_3$ feeds. The results are shown in FIG. 4.

Figure 4:
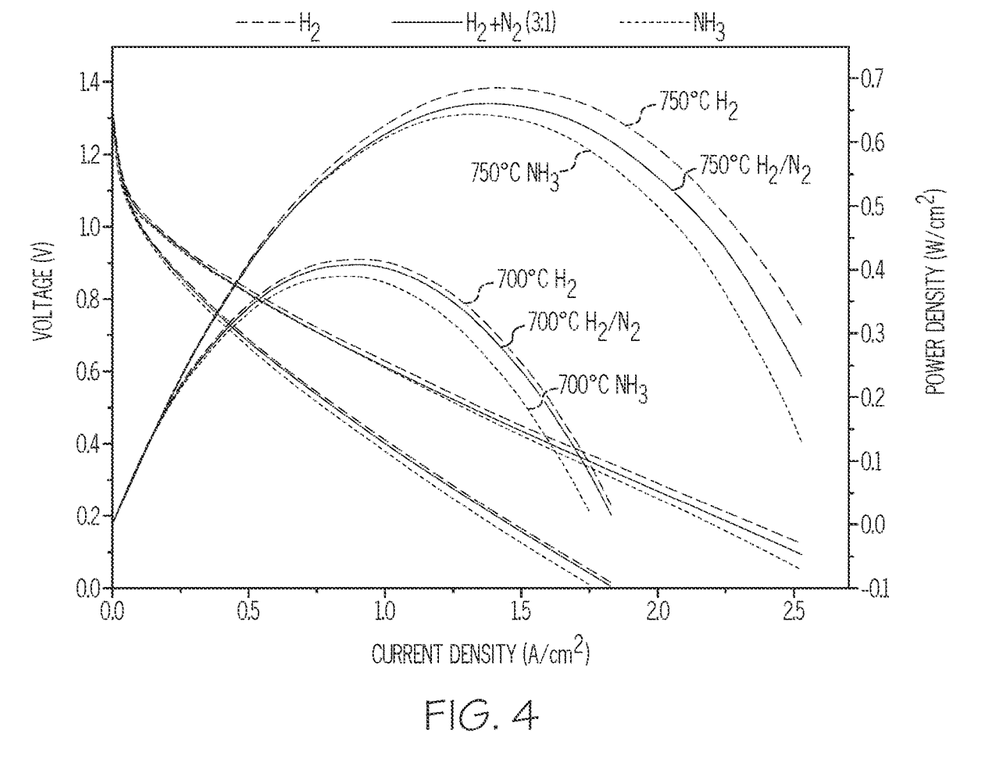
FIG. 4 is a plot of the cell voltage (left y-axis; in volts (V)) and the power density (right y-axis; in $W/cm^2$) as a function of current density (x-axis; in $A/cm^2$) for an anode-supported SOFC (AS-SOFC) fed $NH_3$, a mixture of 75% $H_2$ and 25% $N_2$, or pure $H_2$ at 700° C. and 750° C.

FIG. 4 shows improvement of the performance of the ammonia-fed SOFC to produce power. In particular, the $NH_3$-fed SOFC produces about 94% of the power of the $H_2$-fed SOFC and, considering the dilution effect of the decomposed nitrogen, this difference is almost negligible. The examples also indicate that ammonia can be easily decomposed and fully utilized by SOFCs at temperatures greater than 700° C.

The ammonia-fed SOFCs of Examples 1 and 2 were limited by a higher degradation rate and lower power density than pure $H_2$-fed SOFCs, due to the redox reaction and additional reaction steps on the anode side to break down the $NH_3$. Based on the observed decomposition of ammonia in Examples 1 and 2, it is believed that the incorporation of an ammonia decomposition layer will improve the durability of the solid oxide fuel cells.

Example 3

To demonstrate the effect of infiltrating the anode with nickel nanoparticles, a SOFC was prepared, infiltrated with nickel, and then characterized as in Example 1. In particular, two fuel cells comprising Yttria-stabilized Zirconia (YSZ) anodes were prepared. Then nickel was infiltrated into the anode of one fuel cell and no nickel was added to the second fuel cell.

Power density and cell voltage were measured using a potentiostat for current densities from 0 up to about 0.7 $A/cm^2$ at 750° C. for the SOFC prepared as above. Sample A, which had nickel infiltration into the anode, had an electrolyte that was approximately 1 millimeter (mm) thick using a hydrogen feed at the anode and an air feed at the cathode. Sample B, which had no nickel infiltration into the anode, had an electrolyte that was approximately 1 millimeter (mm) thick using a hydrogen feed at the anode and an air feed at the cathode. Sample C, which had nickel infiltration into the anode, had an electrolyte that was approximately 1 millimeter (mm) thick using an ammonia feed at the anode and an air feed at the cathode. Sample B, which had no nickel infiltration into the anode, had an electrolyte that was approximately 1 millimeter (mm) thick using an ammonia feed at the anode and an air feed at the cathode. Samples B and D are, therefore, comparative examples. The results are shown in FIG. 5.

Figure 5:
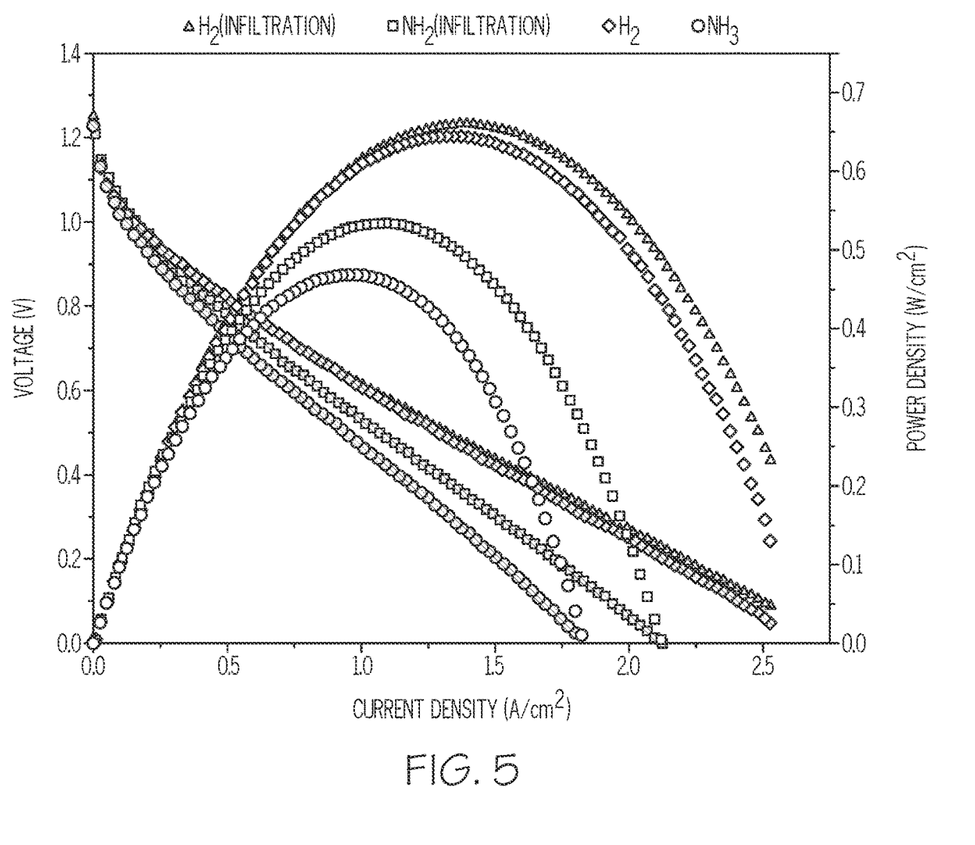
FIG. 5 is a plot of the cell voltage (left y-axis; in volts (V)) and the power density (right y-axis; in watts per square centimeter ($W/cm^2$)) as a function of current density (x-axis; in amps per square centimeter ($A/cm^2$)) for the SOFCs in accordance with embodiments disclosed herein at 750° C.

As shown in FIG. 5, the power density of the cell increases by 23.6% under an $H_2$ atmosphere when the anode is infiltrated with nickel. This effect is even more pronounced under an ammonia atmosphere, where the nickel infiltration contributed to a 37.5% increase in the power density of the cell, as calculated by dividing the infiltrated cell power density divided by the non-infiltrated cell power density multiplied by 100%. Without intending to be bound by any particular theory, it is believed that the difference between the results with an $H_2$ atmosphere and an ammonia atmosphere was at least partially caused by more energetically favorable cracking of ammonia with the nickel infiltrated anode, relative to cracking of $H_2$ with the same anode.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the claims appended hereto should be taken as the sole representation of the breadth of the present disclosure and the corresponding scope of the various embodiments described in this disclosure. Further, it will be apparent that modifications and variations are possible without departing from the scope of the appended claims.

The singular forms "a", "an" and "the" include plural referents, unless the context clearly dictates otherwise.

For the purposes of describing and defining the present disclosure it is noted that the term "about" is utilized in this disclosure to represent the inherent degree of uncertainty that may be attributed to any quantitative comparison, value, measurement, or other representation. The term "about" is also utilized in this disclosure to represent the degree by which a quantitative representation may vary from a stated reference without resulting in a change in the basic function of the subject matter at issue.

As used in this disclosure and in the appended claims, the words "comprise," "has," and "include" and all grammatical variations thereof are each intended to have an open, non-limiting meaning that does not exclude additional elements or steps.

Additionally, the term "consisting essentially of" is used in this disclosure to refer to quantitative values that do not materially affect the basic and novel characteristic(s) of the disclosure. For example, a chemical stream "consisting essentially" of a particular chemical constituent or group of chemical constituents should be understood to mean that the stream includes at least about 99.5% of a that particular chemical constituent or group of chemical constituents.

It should be understood that any two quantitative values assigned to a property may constitute a range of that property, and all combinations of ranges formed from all stated quantitative values of a given property are contemplated in this disclosure.

As used in this disclosure, terms such as "first" and "second" are arbitrarily assigned and are merely intended to differentiate between two or more instances or components. It is to be understood that the words "first" and "second" serve no other purpose and are not part of the name or description of the component, nor do they necessarily define a relative location, position, or order of the component. Furthermore, it is to be understood that the mere use of the term "first" and "second" does not require that there be any "third" component, although that possibility is contemplated under the scope of the present disclosure.

The invention claimed is:

1. A solid oxide fuel cell stack comprising a plurality of solid oxide fuel cells and at least one ammonia decomposition layer, wherein:
    each solid oxide fuel cell comprises a cathode, an anode, and a solid oxide electrolyte between the anode and the cathode, wherein:
        the solid oxide electrolyte comprises a solid oxide,
        the anode comprises a porous scaffold having one or more surfaces,
        the porous scaffold comprises a solid oxide having metal based catalysts,
        the metal based catalysts are at least partially embedded below the one or more surfaces of the porous scaffold, and
        the metal based catalysts are nanosize particles having a size of 10 nm to 100 nm;
    the at least one ammonia decomposition layer is disposed proximate the one or more surfaces of the porous scaffold of one or more of the plurality of solid oxide fuel cells;
    the at least one ammonia decomposition layer is configured to convert ammonia into hydrogen and nitrogen for subsequent feed of hydrogen to the anode of one or more of the plurality of solid oxide fuel cells;
    the at least one ammonia decomposition layer comprises a metal decomposition catalyst comprising nickel; and
    the anode of one or more of the plurality of solid oxide fuel cells is disposed on the at least one ammonia decomposition layer.

2. The solid oxide fuel cell stack according to claim 1, wherein the porous scaffold comprises $La_{0.75}Sr_{0.25}Cr_{0.50}Mn_{0.50}O_3$ (LCSM), $La_{0.6}Sr_{0.4}Co_{0.2}Fe_{0.8}O_3$ (LSCF), $La_{0.2}Sr_{0.8}TiO_3$ (LST) nanofibers, or combinations thereof.

3. The solid oxide fuel cell stack according to claim 1, wherein the solid oxide electrolyte and the porous scaffold of the anode comprise the same solid oxide.

4. The solid oxide fuel cell stack according to claim 1, wherein the solid oxide electrolyte, the anode or both comprise $La_{0.8}Sr_{0.2}Ga_{0.83}Mg_{0.17}O_{2.815}$ (LSGM), $La_{0.75}Sr_{0.25}Cr_{0.50}Mn_{0.50}O_3$ (LCSM), $PrBaMn_2O_{5+\delta}$ (PBMO), stabilized Zr, or combinations thereof.

5. The solid oxide fuel cell stack according to claim 1, wherein both the solid oxide electrolyte and the anode comprise $La_{0.8}Sr_{0.2}Ga_{0.83}Mg_{0.17}O_{2.815}$ (LSGM), $La_{0.75}Sr_{0.25}Cr_{0.50}Mn_{0.50}O_3$ (LCSM), $PrBaMn_2O_{5+\delta}$ (PBMO), stabilized Zr, or combinations thereof.

6. The solid oxide fuel cell stack according to claim 1, wherein the cathode also comprises a porous scaffold, the porous scaffold of the cathode comprising a solid oxide having metal based catalysts disposed on one more surfaces of the porous scaffold of the cathode.

7. The solid oxide fuel cell stack according to claim 1, wherein the metal based catalyst comprises metals selected from nickel, platinum, or combinations thereof.

8. The solid oxide fuel cell stack according to claim 1, wherein the metal based catalyst comprises metal oxides selected from $La_{0.75}Sr_{0.25}Cr_{0.50}Mn_{0.50}O_3$ (LCSM), $PrBaMn_2O_{5+\delta}$ (PBMO), or combinations thereof.

9. The solid oxide fuel cell stack according to claim 1, wherein the cathode comprises $La_{0.6}Sr_{0.4}Co_{0.2}Fe_{0.8}O_3$ (LSCF) infiltrated with $La_{1-x}Sr_xMnO_3$ (LSM), wherein X is greater than 0 and less than 1.

10. The solid oxide fuel cell stack according to claim 1, wherein the at least one ammonia decomposition layer comprises a metal substrate which supports the metal decomposition catalyst.

11. A method utilizing the solid oxide fuel cell stack of claim 1, the method comprising:
    passing ammonia to the at least one ammonia decomposition layer of the solid oxide fuel cell stack, which thereby converts the ammonia to nitrogen and hydrogen; and
    passing the hydrogen to the anode, wherein the at least one ammonia decomposition layer is disposed upstream of the anode.

12. The method according to claim 11, wherein the anode ionizes the hydrogen in the anode by removing electrons.

13. The method according to claim 11, further comprising contacting the cathode of one or more of the plurality of solid oxide fuel cells with an air feed comprising oxygen to produce oxygen ions and an oxygen-deficient air.

* * * * *